United States Patent

[11] 3,564,225

[72] Inventor Charles W. Watson, Jr.
Norristown, Pa.

[21] Appl. No. 681,731
[22] Filed Nov. 9, 1967
[45] Patented Feb. 16, 1971
[73] Assignee Leeds & Northrup Company
Philadelphia, Pa.
a corporation of Pennsylvania

[54] SERIAL BINARY CODED DECIMAL CONVERTER
5 Claims, 8 Drawing Figs.

[52] U.S. Cl. .......... 235/155; 340/347
[51] Int. Cl. .......... H03k 13/258
[50] Field of Search .......... 340/347; 235/155, 165

[56] References Cited

UNITED STATES PATENTS 3,082,950 3/1963 Hogan .......... 235/155
3,249,745 5/1966 Burkhart .......... 235/165

*Primary Examiner*—Maynard R. Wilbur
*Assistant Examiner*—Charles D. Miller
*Attorney*—Woodcock, Phelan & Washburn

ABSTRACT: The disclosure describes a converter in which the number to be converted is inserted into a shift register. The number is recirculated through the shift register in the direction of decreasing significance of the number. During each recirculation cycle partially converted binary coded decimal numbers are produced having a plurality of decades. A binary three is serially added to a decade of the partially converted numbers when that decade has a value which exceeds four.

SERIAL BINARY CODED DECIMAL CONVERTER

BACKGROUND OF THE INVENTION

Most computing systems operate internally in the binary number system whereas the numerical displays and keyboards connected to the computer operate in the decimal system. Converters are required to convert, for example, binary numbers to binary-coded decimal numbers and vice versa. Such converters are described in "Arithmetic Operations in Digital Computers," R. K. Richards, Van Nostrand & Company, pages 286—290.

A particular type of converter for converting between binary and binary coded decimal is described in "Bidec—A Binary to Decimal or Decimal to Binary Converter," by John F. Coulem, IRE Transactions on Electronic Computer, Volume EC-7, No. 4, Dec., 1958, pages 313—316. In the converter described in that article, conversion is accomplished in a shift register. The conversion from binary to binary coded decimal is accomplished by adding three to each group of four bits in the binary number. That is, three is added to the four least significant bits, three is added to the next four significant bits, and so on. This can be accomplished by adding the binary signal representing a three in parallel to each group of four bits and by shifting the register in the direction of increasing significance.

Both of the foregoing operations are difficult to perform. To add a binary three to each group of four bits in parallel requires an excessively large amount of logic circuitry. To shift the binary number in the direction of increasing significance is contrary to the information flow in most computing systems. In most commercially available computing systems the information flow is such that the least significant digit is first. This type of information flow, that is, least significant bit first, is used because arithmetic is most easily accomplished in this manner.

SUMMARY OF THE INVENTION

The present invention relates to a converter for converting between binary numbers and binary coded decimal numbers and more particularly to a converter in which the binary number in a shift register is recirculated in the direction of decreasing significance. The recirculation is performed a number of times equal to the number of bit positions in the shift register plus or minus once to accomplish a shift of one bit position in the required direction. A serial binary full adder-subtracter is inserted in the recirculation loop for adding or subtracting the binary three to or from each of the decades during recirculation.

In conversion from binary to binary-coded decimal, it is necessary to shift one bit position in the direction of greatest significance. This is accomplished by recirculating the number in the direction of decreasing significance, that is, in the normal direction, for a number of times equal to $n$-1 where $n$ is the number of bits in the recirculation path. During the recirculation the serial adder-subtracter may add plus three to each decade of the partially converted binary coded decimal numbers. In conversion from binary coded decimal to binary, a shift of one bit position in the direction of least significance, that is, in the normal direction, is required. In the converter of this invention this is accomplished by recirculating a number of times equal to $n$+1. In this case, the adder-subtracter may subtract a binary three from each decade of the partially converted binary coded decimal numbers (also referred to as BCD numbers).

In this manner, the conversion from binary to binary coded decimal is accomplished without reversing the normal direction of flow of the register. Also, in both conversions, that is, from binary to BCD and BCD to binary, the addition or subtraction of a binary three to or from each decade is accomplished by a single adder-subtracter. This obviates the necessity of providing a plurality of such adder-subtracters for performing the addition or subtraction in parallel.

DESCRIPTION OF THE DRAWINGS

FIG. 2*a* shows the S1 clock pulses;

FIG. 2*b* shows the S3 clock pulses;

FIG. 2*c* shows the S3 clock pulses occurring in the middle of bit times 2 through 16;

FIG. 2*d* shows the S1 clock pulses occurring at the beginning of bit times 2, 6, 10 and 14;

FIG. 2*e* shows the S1 clock pulses occurring at the beginning of bit times 4, 8, 12 and 16;

FIG. 2*f* shows the state of the data input flip-flop; and

FIG. 2*g* shows the S5 clock pulse occurring at the beginning of each recirculating cycle.

DESCRIPTION OF THE PARTICULAR EMBODIMENT

Figure 1:
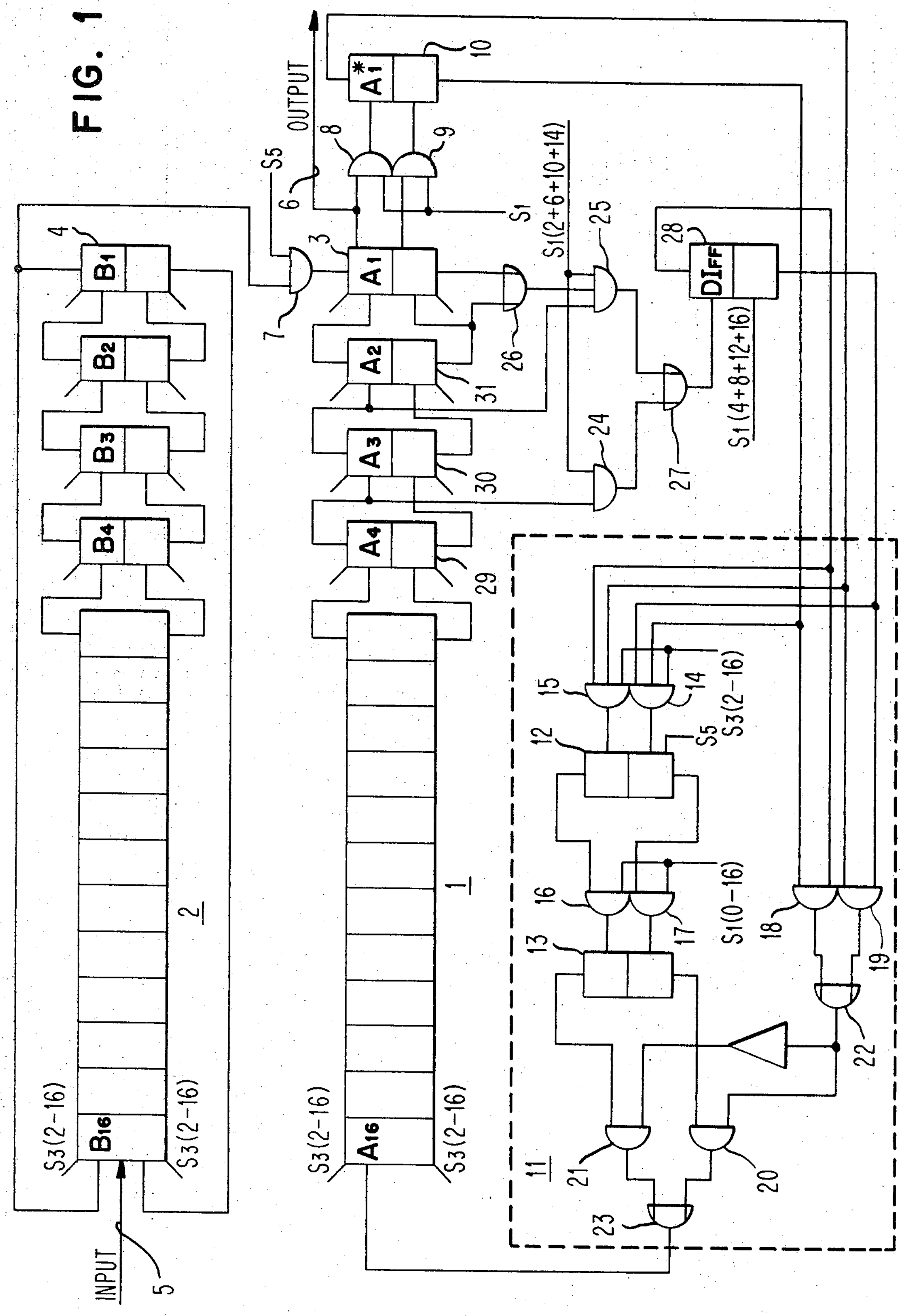
FIG. 1 shows a logic diagram of one embodiment of the converter of this invention.

Referring now to FIG. 1, there is shown the shift register 1, referred to as the A register, for receiving the binary input number, for storing the partially converted binary-coded decimal numbers during recirculation, and for providing the output of the converted binary coded decimal number.

For convenience, there is shown in FIG. 1 an additional register 2, referred to as the B register, which holds the input binary number which is to be converted. Both shift registers may be of the type which includes a suitable number of stages of the Amelco Type 311BST flip-flops, available from the Amelco Semiconductor Division of Teledyne, Inc., 1300 Terra Bella Avenue, Mountain View, California. The shift register 1 includes 16 binary stages. The stage 3 contains the least significant bit. Similarly, in shift register 2, the stage 4 contains the least significant bit.

The binary number to be converted can be serially shifted into register 2 over input line 5 with the least significant bit first. After the conversion is completed the binary-coded decimal number may be shifted out serially on the output line 6. Of course it will be understood that the input can be in parallel to the register 2 and the output can be in parallel from the register 1 after conversion.

The binary bits are transferred from the B register 2 to the A register 1 through the AND gate 7. One suitable type of AND gate for use in this system is identified as the Amelco Type 321 Quad 2 input gate.

The recirculation path includes the AND gates 8 and 9 which are strobed by the clock pulses S1 to transfer each bit from the stage 3 to the stage 10 which provides the input for the recirculation loop.

In order to add or subtract a binary three from each decade during recirculation, the adder-subtracter 11 is provided. The adder-subtracter includes a new carry flip-flop 12, an old carry flip-flop 13 and suitable AND gates 14—21 and OR gates 22 and 23 to make up the usual serial binary full adder-subtracter. To complete the recirculation path the output of OR gate 23 is applied to the most significant stage of the A register 1.

In order to sense when each decade of a partially converted number is greater than four, AND gates 24 and 25 and OR gates 26 and 27 are provided. When a decade contains a number greater than four, the data input flip-flop 28 is set to a "1".

The timing or clock pulses which operate the converter are shown in FIGS. 2*a*—2*g*. These timing pulses will be briefly described before describing the operation of the converter.

Figures 2A, 2B, 2C, 2D, 2E, 2F, 2G:
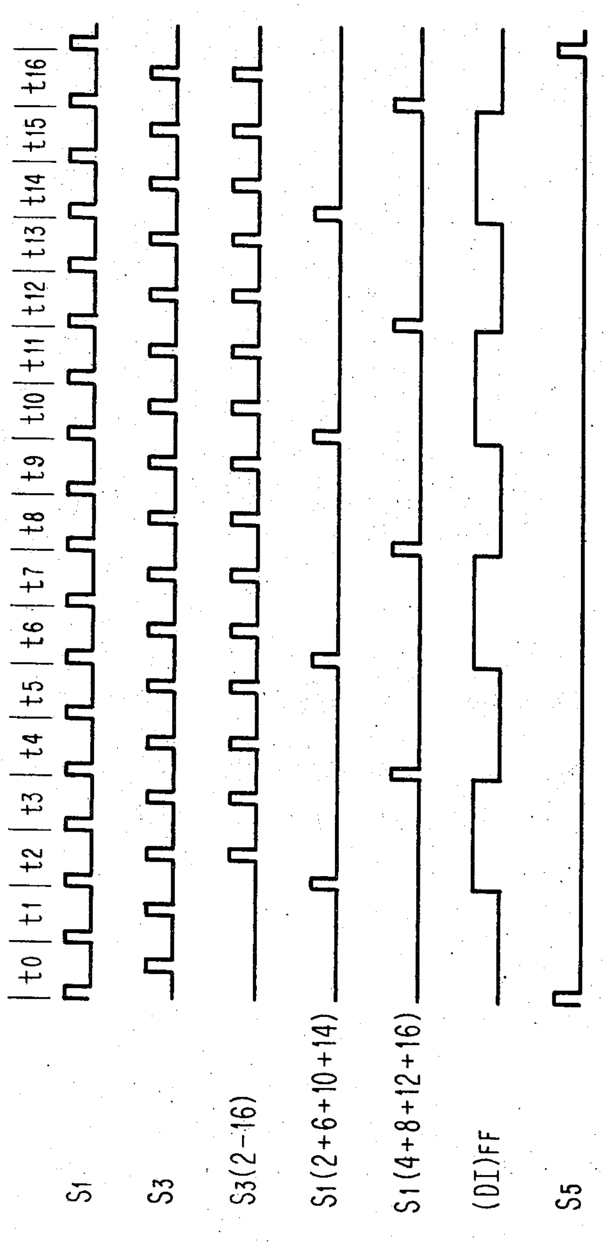
FIGS. 2*a*—2*g* are waveforms depicting the operation of the invention; and particularly

The pulses S1, shown in FIG. 2*a*, occur at the beginning of each bit time.

The S3 pulses, shown in FIG. 2*b*, occur in the middle of each bit time. The S3 (2—16) pulses, shown in FIG. 2*c*, occur in the middle of bit times *t*2 through *t*16. The pulses S1(2+6+10+14) shown in FIG. 2*d*, occur at the beginning of the bit times *t*2, *t*6, *t*10 and *t*14. The pulses S1(4+8+12+16) shown in FIG. 2*e*, occur at the beginning of bit times 4, 8, 12 and 16.

The state of the data input flip-flop 28 is shown in FIG. 2*f*. In this waveform the up condition signifies a "1" or that the flip-flop is set. The S5 pulse, shown in FIG. 2*g*, occurs at the beginning of each recirculation cycle.

OPERATION

The operation of the converter in converting from a binary to a binary coded decimal number can be best understood with reference to the following example. The following tabulation illustrates the operation of the system of FIG. 1 in converting from the binary number 1001110001000 to its binary coded decimal equivalent.

BINARY TO DIGITAL CONVERSION TABULATION

| Line | Step | A-Register BCD | Data Input | Carry | Step | B-Register (Binary) |
|---|---|---|---|---|---|---|
| | | | | | | 1001110001000 |
| 1. | ← | 1 | | | ← | 001110001000 1 |
| 2. | ← | 10 | | | ← | 01110001000 10 |
| 3. | ← | 100 | | | ← | 1110001000 100 |
| 4. | ← | 1001 | 1 | | ← | 110001000 1001 |
| | (2) | 0 100 | 1 | C | (2) | 1110001000 100 |
| | (3) | 00 10 | 0 | C | (3) | 01110001000 10 |
| | (4) | 100 1 | | | (4) | 001110001000 1 |
| | (5) | 1100 | | | (5) | 1001110001000 |
| | (6) | 110 0 | | | (6) | 1001110001000 |
| | (7) | 11 00 | | | (7) | 1001110001000 |
| | (8) | 1 100 | | | (8) | 1001110001000 |
| | (9) | 1100 | | | (9) | 0 100111000100 |
| | (10) | 110 0 | | | (10) | 00 10011100010 |
| | (11) | 11 00 | | | (11) | 000 1001110001 |
| | (12) | 1 100 | | | (12) | 1000 100111000 |
| | (13) | 1100 | | | (13) | 01000 10011100 |
| | (14) | 110 0 | | | (14) | 001000 1001110 |
| | (15) | 11 00 | | | (15) | 0001000 100111 |
| 5. | (16) | 1 1001 | | | (16) | 10001000 10011 |
| | +3 | 1 1100 | | | | |
| 6. | ← | 11 1001 | | | ← | 0001000 100111 |
| | +3 | 11 1100 | | | | |
| 7. | ← | 111 1000 | | | ← | 001000 1001110 |
| | +3 | 1010 1011 | | | | |
| 8. | ← | 1 0101 0110 | | | ← | 01000 10011100 |
| | +3 | 1 1000 1001 | | | | |
| 9. | ← | 11 0001 0010 | | | ← | 1000 100111000 |
| | (2) | 0 1 1000 1001 | | | (2) | 01000 10011100 |
| | (3) | 10 1100 0100 | | | (3) | 001000 1001110 |
| | (4) | 010 110 0010 | | | (4) | 0001000 100111 |
| | (5) | 0010 11 0001 | | | (5) | 10001000 10011 |
| | (6) | 1001 0 1 1000 | | | (6) | 110001000 1001 |
| | (7) | 0100 10 1100 | | | (7) | 1110001000 100 |
| | (8) | 0010 010 110 | | | (8) | 01110001000 10 |
| | (9) | 0001 0010 11 | | | (9) | 001110001000 1 |
| | (10) | 1000 1001 0 1 | | | (10) | 1001110001000 |
| | (11) | 1100 0100 10 | | | (11) | 1001110001000 |
| | (12) | 110 0010 010 | | | (12) | 1001110001000 |
| | (13) | 11 0001 0010 | | | (13) | 1001110001000 |
| | (14) | 1 1000 1001 0 | | | (14) | 0 100111000100 |
| | (15) | 1100 0100 10 | | | (15) | 00 10011100010 |
| 10. | (16) | 110 0010 0101 | | | (16) | 000 1001110001 |

Binary to Digital Conversion Tabulation (Continued)

| Line | Step | A-Register BCD | Data Input | Carry | Step | B-Register (Binary) |
|---|---|---|---|---|---|---|
| 10. | | 110 0010 0101 | 1 | | | 000 1001110001 |
| | (2) | 0 11 0001 0010 | 1 | C | (2) | 1000 100111000 |
| | (3) | 00 1 1000 1001 | 0 | C | (3) | 01000 10011100 |
| | (4) | 000 1100 0100 | | C | (4) | 001000 1001110 |
| | (5) | 1000 110 0010 | | | (5) | 0001000 100111 |
| | (6) | 0100 0 11 0001 | | | (6) | 10001000 10011 |
| | (7) | 1010 00 1 1000 | | | (7) | 110001000 1001 |
| | (8) | 0101 000 1100 | | | (8) | 1110001000 100 |
| | (9) | 0010 1000 110 | 1 | | (9) | 01110001000 10 |
| | (10) | 1001 0100 0 11 | 1 | | (10) | 001110001000 1 |
| | (11) | 0100 1010 00 1 | 0 | C | (11) | 1001110001000 |
| | (12) | 0010 0101 000 | | C | (12) | 1001110001000 |
| | (13) | 1001 0010 1000 | | | (13) | 1001110001000 |
| | (14) | 100 1001 0100 0 | | | (14) | 1001110001000 |
| | (15) | 10 0100 1010 00 | | | (15) | 0 100111000100 |
| 11. | (16) | 1 0010 0101 0000 | | | (16) | 00 10011100010 |
| | +3 | 1 0010 1000 0000 | | | | |
| 12. | ← | 10 0101 0000 0000 | | | ← | 0 100111000100 |
| | +3 | 10 1000 0000 0000 | | | | |
| 13. | ← | 101 0000 0000 0000 | | | ← | 1001110001000 |

Initially, the number 1001110001000 is contained in the B register 2, with the least significant bit, the bit at the right of the foregoing number, in stage 4.

Both A register 1 and B register 2 are shifted by the S3(2—16) pulses. The first such pulse occurs in the middle of bit time *t*2, as indicated in FIG. 2*c*.

During an initial recirculation cycle, the pulses S3(2—16) recirculate the bits in the B register. Since there are 15 of the S3(2—16) pulses, at the end of this first recirculation cycle the most significant bit of the number 1001110001000 will be in the stage 4.

Upon the occurrence of the next clock pulse S5 the bit in the stage 4 is also inserted through AND gate 7 to stage 3 of the A register. This clock pulse occurs at the beginning of what will be referred to as the first recirculation cycle. Upon the occurrence of the next S1 pulse, this bit is transferred through AND gates 8 and 9 into the input stage 10 for the recirculation loop. Normally, the bit will pass unaltered through the adder-subtracter 11 because the data input flip-flop 28 is in a "0" condition.

During the first recirculation cycle, the other bit in the A register 1 will be recirculated. At the end of the first recirculation cycle the condition of the registers is shown in line 1 of the foregoing tabulation. The least significant stage 3 of the A register contains a "1" and the remainder of the stages are zeros. The number in the B register is 001110001000 1.

During the second and third recirculation cycles a similar operation is performed. The S5 pulse at the beginning of the second recirculation cycle transfers the bit "0" from stage 4 through AND gate 7 to the stage 3. After recirculation by the pulses S3(2—16) during the second recirculation cycle the two least significant bits in the A register are as shown in line 2 of the foregoing tabulation while the remainder of the bits are zero. The bits in the B register 2 at the end of the second recirculation cycle are also shown in line 2.

After the third recirculation cycle, the three least significant bits in the A register are as shown in line 3 of the foregoing tabulation and the remainder are zero.

After the fourth recirculation cycle the four least significant bits in the A register are as shown in line 4 of the foregoing tabulation and the remainder of the bits are zero. At this time the AND gate 24 is enabled because the stage 29 contains a 1. During the succeeding recirculation cycle, the first of the pulses S1(2+6+10+14) passes through AND gate 24 and through OR gate 27 to set the data input flip-flop 28 to a 1 condition. The flip-flop 28 will remain in the 1 condition through two bit times, that is, during the bit times *t*2 and *t*3. At the beginning of bit time *t*4, data input flip-flop 28 is reset by the first of the pulses S1(4+8+12+16).

When the data input flip-flop 28 is in the "1" condition, a binary three is added to the decade which includes the four bits from the stages 29, 30 and 31 and 3. The addition of a binary three to this decade is illustrated in the foregoing tabulation by the lines labeled 2 through 16. In the tabulation, the line 2 shows the state of the A register at the end of bit time *t2*. It will be readily observed that at the end of bit time *t16*, line 16, a binary three has been added to the decade. The operation of the adder-subtracter 11 is in accordance with well understood principles such as described more fully in the previously mentioned book by R. K. Richards, Chapter 4.

Its operation will be described briefly in adding the "1" in stage 10 to the "1" in the data input flip-flop 28. The top input to AND gate 18 is a 0 obtained from the complement output of stage 10; hence the output of AND gate 18 is a "0". The bottom input to AND gate 19 is a 0 obtained from the complement output of flip-flop 28; hence the output of AND gate 19 is a 0. The output of OR gate 22 is 0, and the result of the addition is a 0 which is set into the most significant bit position of the A register 1. This zero is indicated by the left-hand "0" in the line 2.

The result of the addition of the data input 1 and the 1 from the stage 10, results in a carry. Note that the top two inputs to AND gate 15 are 1's. Therefore, the next S3(2—16) pulse passes through AND gate 15 and sets the new carry flip-flop 12. The existence of this carry is indicated by a "C" in the carry column, line 2, in the foregoing tabulation. Upon the occurrence of the next S1(0—16) pulse, the 1 in the new carry flip-flop 12 is transferred through AND gate 16 into the old carry flipnflop 13.

During the bit time $t3$, the carry in flip-flop 13 is added to the sum of the data input flip-flop 28 and the stage 10. In this case a carry is added to two zeros, producing a 1. As indicated on line 4, this 1 is transferred to the most significant bit position of the A register, indicated by the left-hand bit in line 4 being a 1.

Now that a binary three has been added to the partially converted decade, the shifting is continued throughout the recirculation cycle so that the bits in the A register are as indicated on line 5 of the foregoing tabulation. It will be noted that at the end of bit time 15, a line 15 in the tabulation, the number 1100 is in register A. That is, a binary three has been added to the decade 1001 which was in these bit positions at the end of the fourth recirculation cycle, line 4 in the tabulation.

At the end of bit time 15 another S5 pulse occurs, thereby transferring another bit from stage 4 of the B register into the least significant stage 3 of the A register. At the end of bit time 16 the five least significant bits of the A register are 11001 as indicated on line 16 of the tabulation.

The operation continues through 13 recirculation cycles as indicated in the tabulation.

Complete recirculation cycles have been shown only for the 10th and 11th recirculation cycles. These are instructive. At the beginning of the 10th recirculation cycle, line 9, the decade represented by the four least significant digits is 0010, representing a two. This is not greater than four. Therefore, there is no addition of a three to the decade. In the 11th recirculation cycle, two decades contain numbers greater than four. Note that in line 10 of the above tabulation the least significant decade 0101 is greater than four. The second from least significant decade 0010 is not greater than four, but the next decade 110 is greater than four. During the 11th recirculation cycle a three is added to the decade during bit times $t2$ and $t3$, and a three is added during bit times $t10$ and $t11$. The same adder-subtracter is employed to make the addition. If the recirculation technique of this invention were not employed, it would be necessary to use at least two adders to make the addition in parallel. In fact, an adder would be required for each decade.

At the end of recirculation cycle 13, the number in the A register is 101000000000000. In binary-coded decimal, this represents 5,000. In this manner, the binary number 1001110001000 has been converted to binary-coded decimal.

While in the particular example described, 13 recirculation cycles were required for conversion, the number of cycles required will be variable.

While FIG. 1 has been described with reference to a conversion from binary to binary-coded decimal, it will be appreciated that the same converter should be used to convert from BCD to binary. In this case, the binary-coded decimal input number is set into the A register 1. At the beginning of each recirculation cycle, the least significant bit is transferred from stage 3 of the A register to stage 4 of the B register. In this case, the bits will be recirculated $n+1$ or 17 times, where $n$ is 16. In the previously described operation, the bits were recirculated $n-1$ or 15 times because there were 15 of the pulses S3 (6—16) shown in FIG. 2*c*. In the BCD to binary conversion, there will be 17 of these pulses. The result will be that at the end of a recirculation cycle the number in the A register will be shifted one bit position to the right, that is, in the normal direction of decreasing significance.

The other change which must be made for BCD to binary conversion is that the adder-subtracter 11 must be switched to subtract a three from each decade having a significance greater than seven. Subtraction by using complementary arithmetic is well known.

The present invention has applicability to converters which operate between numbers in other base systems. For example, it may be used to convert between a binary representation of time and a representation of time in hours, minutes and seconds. In such a representation, the most significant digit in minutes and seconds is in base number "6." By way of example, a converter can be provided for converting from a binary representation of 45,444 seconds to a representation in hours, minutes and seconds, which is 12 hours, 37 minutes and 24 seconds. That is, the binary representation of the number of seconds, 1011000111000100, must be converted to the representation:

| Hours | | Minutes | | Seconds | |
|---|---|---|---|---|---|
| 1 | 2 | 3 | 7 | 2 | 4 |
| 01 | 0010 | 011 | 0111 | 010 | 0100 |

As a very simplified description of the operation of the system, consider the conversions between 60 seconds, the binary number 111100, and the representation in hours, minutes and seconds, which is:

| | A-Register 2nd Dec. | Senary | 1st Dec. | B-Register Binary |
|---|---|---|---|---|
| | | | | 111100 |
| 1 | | | 1 | 11100 |
| 2 | | | 11 | 1100 |
| 3 | | | 111 | 100 |
| +3 | | | 1010 | 100 |
| 4 | | 1 | 0101 | 00 |
| +3 | | 1 | 1000 | 00 |
| 5 | | 011 | 0000 | 0 |
| +1 | | 100 | 0000 | 0 |
| 6 | 0001 | 000 | 0000 | |

The operation of the converter of this invention in making this conversion will be understood from the foregoing table, which is similar to the tabulation previously given in conjunction with the binary to BCD converter. In making this conversion, a three is added to the decades which are greater than four. A one is added to the senaries (a senary is a base "6" digit corresponding to a decade in the digital number system) which are greater than two. For example, after the third recirculation cycle, line 3 in the tabulation, the first decade is 0111 which is greater than four. Therefore, a three is added to this partially converted decade. Similarly, after the fourth recirculation cycle, the first decade is 0101. This is greater than four and again a three is added. After the fifth recirculation cycle, the senary is 011. This is greater than two; therefore, a one is added to this partially converted senary. It will be seen that after six recirculation cycles the conversion between the binary number 111100, representing 60 seconds, and the representation 0001 000 0000, which represents 1 minute, has been completed.

While particular embodiments of the invention have been shown and described, it will be understood that various other modifications are possible without departing from the principles of the invention. The appended claims are, therefore, intended to cover any such modifications within the true spirit and scope of the invention.

I claim:

1. A binary to decimal converter for converting between a number expressed in binary notation and a number expressed in binary coded decimal notation, comprising:

a shift register having a recirculation path and a predetermined number of bit positions to receive the bits of the number to be converted;

means for recirculating said register by shifting the bits of said register in the direction of decreasing significance by a number of bit positions equal to the number of bit positions in said recirculation path plus or minus one during each recirculating cycle to produce during each recirculating cycle partially converted numbers having a plurality of decades;

means for generating an output signal each time one of said decades in the four least significant bit positions of said shift register is greater than four, or seven;

means for generating a binary signal representing the value of three in response to said output signal; and a serial binary full adder-subtracter in said recirculation path for adding and subtracting said binary signal representing the value of three to said partially converted numbers.

2. A binary to decimal converter for converting a number expressed in binary notation to said number expressed in binary coded decimal notation, comprising:

a shift register having a recirculation path and a predetermined number of bit positions to receive the bits of said number in binary notation;

means for recirculating said register by shifting the bits of said register in the direction of decreasing significance by a number of bit positions equal to the number of bit positions in said recirculation path minus one during each recirculating cycle to produce during each recirculating cycle partially converted binary coded decimal numbers having a plurality of decades, means for generating an output signal each time one of said decades of said partially converted binary-coded decimal numbers in the four least significant bit positions of said shift register is greater than four;

means responsive to said output signal for generating a binary signal representing the value of three; and a serial binary full adder-subtracter for adding said binary signal representing the value of three to said one of said decades in said recirculating cycle.

3. The apparatus recited in claim 2 further including a second shift register having a recirculation path and a predetermined number of bit positions for receiving said number expressed in binary notation, said least significant bit position of said second shift register being connected to insert one bit of a said number expressed in binary notation into the least significant bit position of said first shift register during each recirculating cycle.

4. The apparatus recited in claim 2 wherein the means for generating an output signal includes:

a first gate having an input connected to sense the 1 state of the fourth from the least significant bit position of said shift register;

a second gate having an input connected to sense the 1 state of the third from the least significant list position and either of the least significant or second from least significant bit positions of said shift register; and an OR circuit, the outputs of said first and second gates being applied to said OR circuit, the output of said OR circuit producing said output signal.

5. The apparatus recited in claim 2 wherein said means responsive to said output signal is a flip-flop, said flip-flop being set at a 1 condition by said output signal, said flip-flop being reset by a clock pulse occurring two bit times after the occurrence of said output signal.

PO-1050
(5/69)

UNITED STATES PATENT OFFICE
CERTIFICATE OF CORRECTION

Patent No. 3,564,225 Dated February 16, 1971

Inventor(s) Charles W. Watson, Jr.

It is certified that error appears in the above-identified patent and that said Letters Patent are hereby corrected as shown below:

Col. 1, line 47, "minus once" should read --minus one--.

Col. 1, line 10, "binary-coded" should be --binary codec

Col. 1, line 52, "binary-coded" should be --binary coded--.

Col. 2, line 23, "binary-coded" should be --binary coded--.

Col. 2, line 30, "311BST flip-flops" should read --311RST flip-flops --.

Col. 2, line 38, "binary-coded" should read --binary co

Col. 4, line 39, "contains a 1" should read --contains a "1"--

Col. 4, line 42, "a 1 condition." should read --a "1" condition.--

Col. 4, line 43, "the 1 condition" should read --the "1 condition--.

UNITED STATES PATENT OFFICE
CERTIFICATE OF CORRECTION

Patent No. 3,564,225 Dated February 16, 1971

Inventor(s) Charles W. Watson, Jr. PAGE - 2

It is certified that error appears in the above-identified patent and that said Letters Patent are hereby corrected as shown below:

Column 4, line 61, "a 0 obtained" should read -- a "0" obtained --; line 63, "a 0 obtained" should read -- a "0", obtained --; line 65, "is a 0." should read -- is a "0". --; same line 65, "is 0, and" should read -- is "0", and --; lin 66, "is a 0" should read -- is a "0" --; line 69, "input 1 a the 1 from" should read -- input "1" and the "1" from --; li 71, "are 1's." should read -- are "1's". --; line 75, "the 1 in" should read -- the "1" in --. Column 5, line 5, "a 1." should read -- a "1". --; line 6, "line 4, this 1 is" should read -- line (4), this "1" is --; line 8, "being a 1." shoul read -- being a "1". --; lines 44, 46, 51 and 53, "binary-co each occurrence, should read -- binary coded --; same column line 60, "S3 (6-16)" should read -- S3 (2-16) --. Column 6, 6, "101100011000100" should read -- 1011000110000100 --. Col 7, line 21, "binary-coded" should read -- binary coded --. Column 8, line 7, "bit of a said" should read -- bit of sai line 12, "the 1 state" should read -- the "1" state --; line "the 1 state" should read -- the "1" state --; line 16, "lis position" should read -- bit position --, line 24, "a 1 cond should read -- a "1" condition --.

Signed and sealed this 14th day of March 1972.

(SEAL)
Attest:

EDWARD M.FLETCHER,JR.
Attesting Officer

ROBERT GOTTSCHALK
Commissioner of Pate